United States Patent
Paraskevopoulos et al.

(10) Patent No.: US 6,486,924 B1
(45) Date of Patent: Nov. 26, 2002

(54) TELEVISION ANTENNA WITH BYPASSABLE AMPLIFIER CIRCUIT

(75) Inventors: Nicholas G. Paraskevopoulos, Pt. Jefferson; Nina Krikorian, Huntington, both of NY (US)

(73) Assignee: Terk Technologies Corp., Commack, NY (US)

( * ) Notice: Subject to any disclaimer, the term of this patent is extended or adjusted under 35 U.S.C. 154(b) by 0 days.

(21) Appl. No.: 09/496,680

(22) Filed: Feb. 3, 2000

(51) Int. Cl.$^7$ .......................... H04N 5/268; H04N 5/46; H04N 5/45; H04L 7/00
(52) U.S. Cl. ................. 348/705; 348/706; 348/555; 348/565; 340/2.8; 370/357
(58) Field of Search ................................. 348/705, 706, 348/555, 565; 340/2.1, 2.4, 2.6, 2.8; 370/357, 360

(56) References Cited

U.S. PATENT DOCUMENTS

| | | | | |
|---|---|---|---|---|
| 4,996,597 A | * | 2/1991 | Duffield | 358/181 |
| 5,420,534 A | * | 5/1995 | Elabd | 327/404 |
| 5,572,263 A | * | 11/1996 | Kim et al. | 348/705 |
| 5,715,247 A | * | 2/1998 | Nara et al. | 370/360 |
| 5,754,597 A | * | 5/1998 | Lurey et al. | 375/295 |
| 5,889,775 A | * | 3/1999 | Sawicz et al. | 370/360 |
| 6,072,541 A | * | 6/2000 | Song | 348/706 |
| 6,122,018 A | * | 9/2000 | Sugihara et al. | 348/705 |
| 6,208,388 B1 | * | 3/2001 | Farleigh | 348/705 |

* cited by examiner

Primary Examiner—John Miller
Assistant Examiner—Paulos Natnael
(74) Attorney, Agent, or Firm—Gerald T. Bodner

(57) ABSTRACT

An indoor television antenna has a bypassable amplifier circuit, which is user-controllable to switch between an amplification signal path and a unity gain signal path. The amplifier circuit, also referred to herein as a television signal switching circuit, includes a first switching circuit, a second switching circuit, a third switching circuit and a switching control circuit. The first switching circuit is coupled to the second switching circuit by the amplification and unity gain signal paths, which are substantially isolated from each other. An input of the first switching circuit is responsive to an antenna, and an output of the second switching circuit is coupled to a first input of the third switching circuit. A second input of the third switching circuit is coupled to a game port signal, and an output of the third switching circuit is ultimately coupled to a television receiver. The first, second and third switching circuits are responsive to one or more switching control signals from the switching control circuit. The first switching circuit selectively routes the television signal from the antenna through either the amplification signal path or the unity gain signal path in response to one or more switching control signals. Likewise, the second switching circuit selectively routes the television signal from either amplification signal path or the unity gain signal path to the third switching circuit in response to one or more switching control signals. Similarly, the third switching circuit selectively routes the television signal from the output of the second switching circuit or a game port signal from a game port input to the television receiver in response to one or more switching control signals.

24 Claims, 17 Drawing Sheets

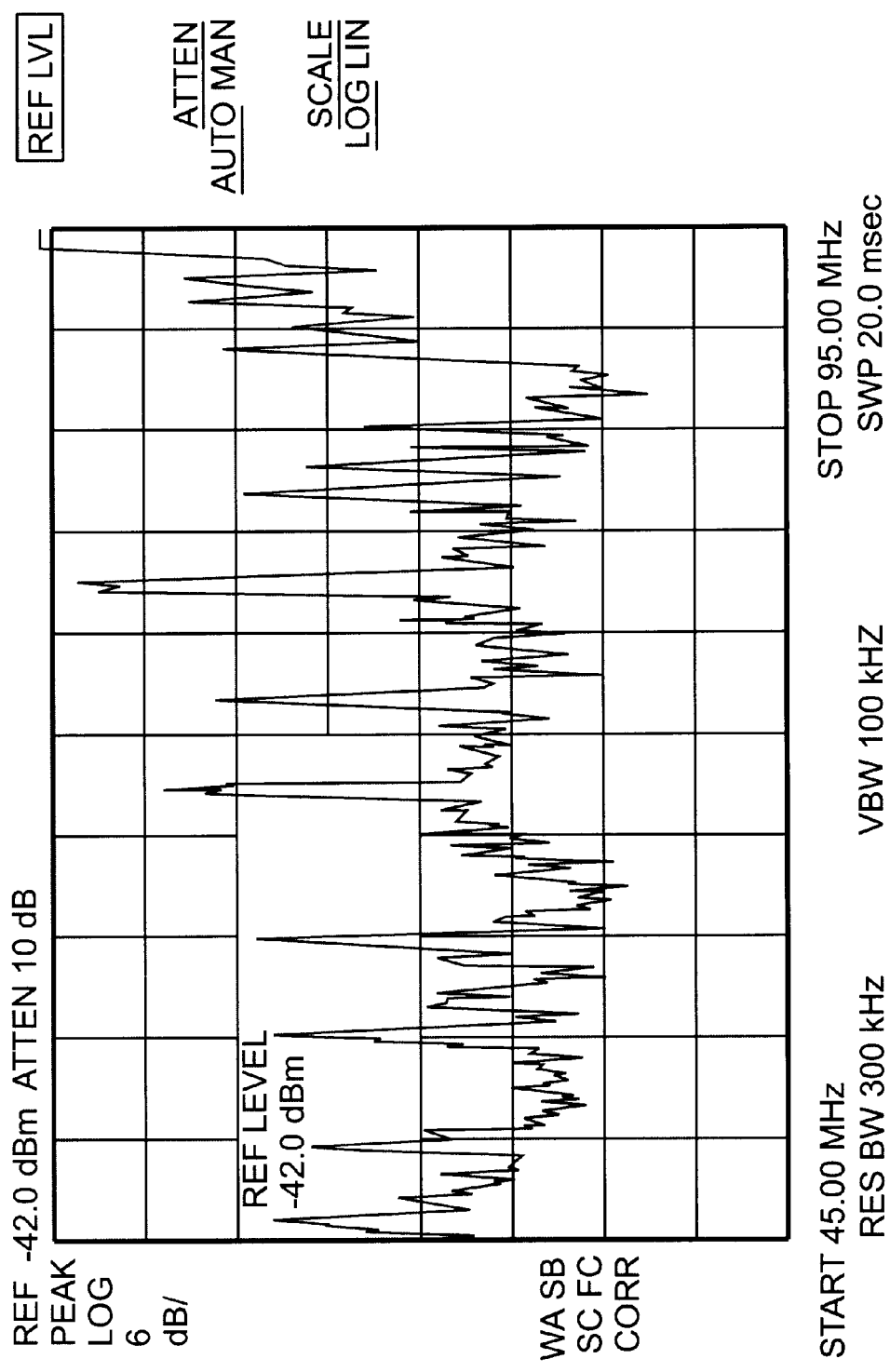

TELEVISION ANTENNA WITH BYPASSABLE AMPLIFIER CIRCUIT

BACKGROUND OF THE INVENTION

1. Field of the Invention

This invention generally relates to improving the reception of a broadcast, cable or game port television signal, and more particularly relates to isolating alternate paths of the television signal.

2. Description of the Prior Art

As towns and cities become more populated, the number of obstructions to broadcast signals, such as those used for television and radio, also increases. These obstructions introduce substantial signal reflections, which result in intolerable reductions in the signal-to-noise ratio (SNR) of the broadcast signal after it is received. Additional factors that decrease the SNR include the increased use of cellular and mobile communications, broadcast signals that are received over greater distances, and the increased utilization of available bandwidth.

Amplification of the broadcast signal can largely overcome problems associated with reductions in the SNR. However, amplification is neither always necessary nor desirable, such as when a receiver is in close proximity to a transmission station. In this case, providing an alternate path for the broadcast signal, which exhibits essentially unity gain, optimizes reception.

FIG. 1 is a block diagram of a typical indoor television antenna having a switchable amplifier circuit, more generally referred to as a television signal switching circuit 10. The switching circuit 10 includes an amplification/unity gain signal path 12 and a game port signal path 14. The amplification/unity gain signal path 12 is coupled in series between an antenna 16 and a television receiver 18.

The amplification/unity gain signal path 12 includes the series connection of an amplifier circuit 20, a direct current (DC) blocking capacitor 21, and a diode isolation circuit 23. The antenna 16 is coupled to an input of the amplifier circuit 20, and an output of the amplifier circuit 20 is coupled to a first end of the capacitor 21. A second end of the capacitor 21 is coupled to an input of the diode isolation circuit 23, and the output of the diode isolation circuit 23 is coupled to the television receiver 18. The amplifier circuit 20 is also coupled to an amplification control circuit 22, which can selectively, under the control of a user, supply power to the amplifier circuit 20 and adjust the amount of gain provided by the amplifier circuit 20.

The diode isolation circuit 23 includes two diodes coupled in series. The anode of a first diode is coupled to the input of the diode isolation circuit 23, and selectively coupled to a DC bias. The cathode of the first diode is coupled to the anode of a second diode, and the cathode of the second diode is coupled to the output of the diode isolation circuit 23.

The game port signal path 14 is coupled in series between a game port input 17 and the television receiver 18. The game port signal path 14 includes the series connection of a DC blocking capacitor 25 and a diode isolation circuit 27. The game port input 17 is coupled to a first end of the capacitor 25, and a second end of the capacitor 25 is coupled to an input of the diode isolation circuit 27.

The diode isolation circuit 27 is substantially the same as the diode isolation circuit 23 already described. The output of both diode isolation circuits 23, 27 are coupled to each other, a first end of a direct current (DC) leakage resistor 29, and the television receiver 18. A second end of the resistor 29 is coupled to ground and provides a path for residual charge introduced by the DC bias to escape.

If the DC bias is applied to the diode isolation circuit 27 in the game port signal path 14, the diodes in the isolation circuit 27 become forward biased and a game port signal in the game port signal path 14 is allowed to pass to the television receiver 18. By applying the DC bias to the isolation circuit 27 in the game port signal path 14, the DC bias is not applied to the isolation circuit 23 in the amplification/unity gain signal path 12. This causes the diodes in the path 12 to remain off or in a non-conductive state, which isolates the output of the amplifier circuit 20 from the television receiver 18.

Likewise, if the DC bias is applied to the diode isolation circuit 23 in the amplification/unity gain signal path 12, the diodes in the isolation circuit 23 become forward biased and a television signal in the amplification/unity gain signal path is allowed to pass to the television receiver 18. By applying the DC bias to the isolation circuit 23 in the amplification/unity gain signal path 14, the DC bias is not applied to the isolation circuit 27 in the game port signal path 14. This causes the diodes in the path 14 to remain off or in a non-conductive state, which isolates the game port input 17 from the television receiver 18.

If the user chooses to provide power to the amplifier circuit 20 via the amplification control circuit 22, the television signal seen by the television receiver 18 exhibits that amount of gain chosen by the user. In contrast, if the user chooses not to provide power to the amplifier circuit 20, the amplifier circuit 20 essentially becomes a short circuit and the television receiver 18 sees the television signal with essentially unity gain.

However, one disadvantage with the conventional approach shown in FIG. 1 is that the diode isolation circuits 23, 27 do not completely isolate the amplification/unity gain signal path 12 and game port signal path 14. For instance, portions of the amplification/unity gain signal path 12 remain in the circuit even if the game port signal path 14 is chosen. These portions act as stubs terminated by an impedance that creates reflections, and thus noise, in the television signal. In addition, the diodes in the isolation circuit 23 introduce leakage of either the television signal or the game port signal into the chosen path due to their poor isolation.

Thus, the approach shown in FIG. 1 does not result in two independent and isolated paths. Rather, this approach results in two essentially composite paths, each of which includes signal reflections and leakage introduced by the path not selected.

OBJECTS AND SUMMARY OF THE INVENTION

It is an object of the present invention to provide an apparatus for improving the reception of a television signal by a television receiver.

It is a further object of the present invention to provide an apparatus for reducing signal reflection, crosstalk, and noise in and between alternate paths of a broadcast, cable or game port television signal having different gains associated therewith.

It is yet a further object of the present invention to provide an apparatus for amplifying off air broadcast television signals over a broad range of gains, which increases the associated signal-to-noise ratio (SNR) without disrupting cable or game port signals.

It is still another object of the present invention to provide an apparatus for selectively applying unit gain or a variable gain to off air broadcast television signals, which increases the SNR of the television signal without disrupting cable or game port signals.

It is a further object of the present invention to provide an apparatus for maximizing isolation between alternate paths of a broadcast, cable or game port television signal having different gains associated therewith.

In accordance with one form of the present invention, a television signal switching circuit is provided, which includes an amplification signal path and a unity gain signal path. A first switching circuit and a second switching circuit, which preferably include relays, substantially isolate the amplification signal path from the unity gain signal path. One or more antennas receive the television signal and output it to an input of the first switching circuit. The amplification and unity gain signal paths are coupled in parallel between the first and second switching circuits. An output of the second switching circuit is coupled to a third switching circuit which isolates the output of the second switching circuit from a game port input. The third switching circuit selectively routes either the output of the second switching circuit or the game port input to the television receiver.

A switching control circuit outputs a switching control signal, which controls the first, second, and third switching circuits. In response to the switching control circuit, the first and second switching circuits route the received television signal through either the amplification signal path or the unity gain signal path, and the third switching circuit routes either the output of the second switching circuit or the game port input to the television receiver. Thus, since the amplification, unity gain, and game port signal paths are isolated and the television signal does not flow through any portion of the path not selected, signal reflections, noise, and crosstalk between these paths are minimized. The switching control circuit also provides a gain control signal to the amplifier, which can adjust the gain applied to the television signal in the amplification signal path.

In accordance with yet another form of the present invention, the first and second switching circuits are omitted and the antenna is coupled to the third switching circuit via the amplification signal path.

In accordance with still another form of the present invention, an isolation circuit is substituted for the first switching circuit.

In accordance with yet another form of the present invention, a power combiner circuit is substituted for the second switching circuit.

In accordance with still another form of the present invention, a power divider circuit is substituted for the first switching circuit.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 4A and 4B are graphs of signal strength in dBm versus frequency, which show a frequency spectrum of a broadcast television signal in the Very High Frequency (VHF) range following an amplification/unity gain signal path in the conventional television signal switching circuit shown in FIG. 1 over a low VHF frequency range and a high VHF frequency range, respectively.

DETAILED DESCRIPTION OF THE PREFERRED EMBODIMENTS

Figure 2:
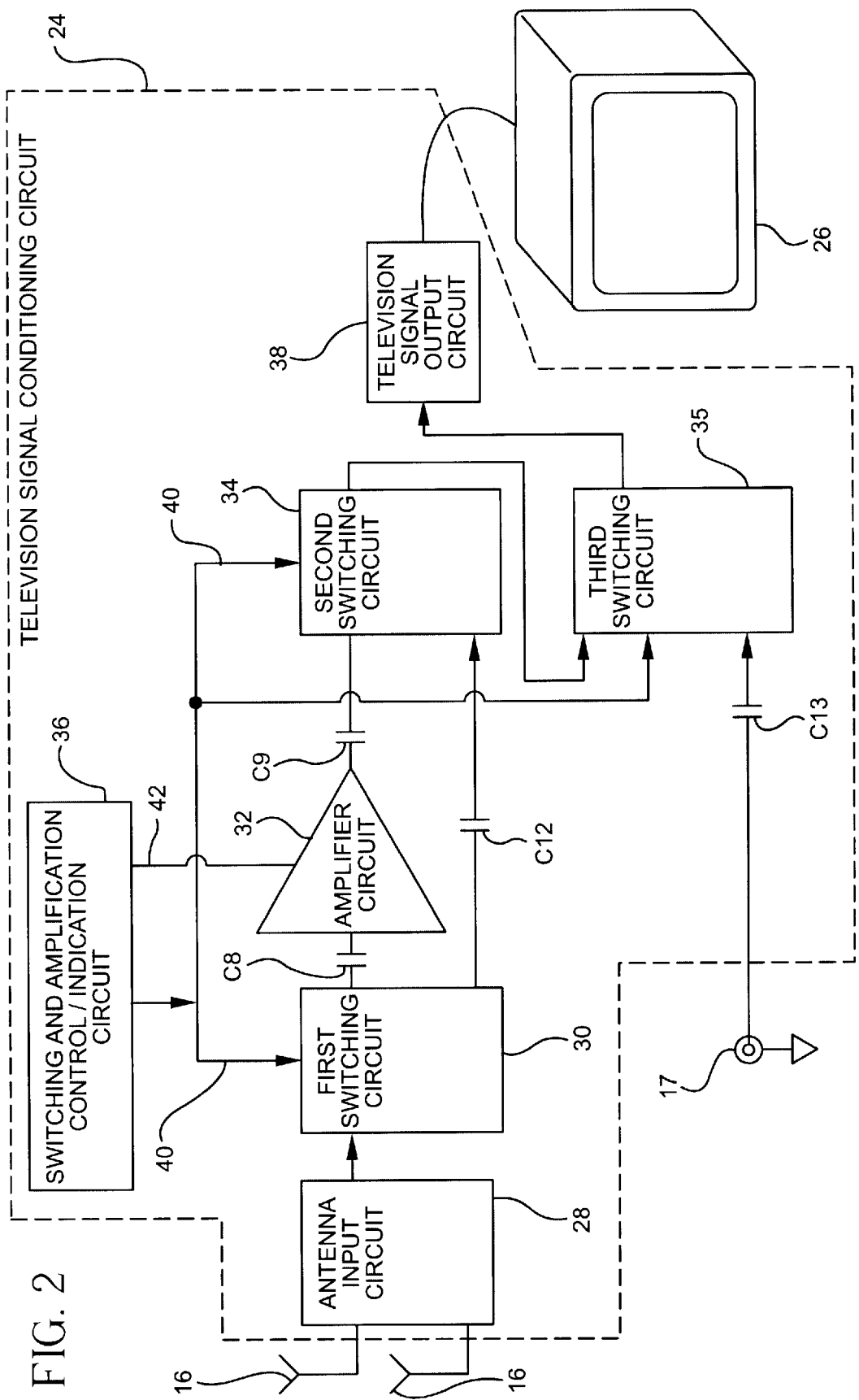
FIG. 2 is a block diagram of a preferred embodiment of a television signal switching circuit formed in accordance with the present invention.

FIG. 2 shows a broadcast, cable or game port television signal switching circuit 24 formed in accordance with the present invention. The television signal switching circuit 24 is coupled in series between one or more antennas 16, a game port input 17 and a television receiver 26. The switching circuit 24 includes an antenna input circuit 28, a first switching circuit 30, an amplifier circuit 32, a second switching circuit 34, a third switching circuit 35, a switching and amplification control/indication circuit 36, a television signal output circuit 38, and 1000 pF capacitors C8, C9, C12 and C13.

Each of the antennas 16 are coupled to an input of the antenna input circuit 28, and an output of the antenna input circuit 28 is coupled to an input of the first switching circuit 30. A first output of the first switching circuit 30 is coupled to a first end of the capacitor C8, and a second end of the capacitor C8 is coupled to an input of the amplifier circuit 32. An output of the amplifier circuit 32 is coupled to a first end of the capacitor C9, and a second end of the capacitor C9 is coupled to a first input of the second switching circuit 34. The series connection of the capacitors C8, C9 and the amplifier circuit 32 defines an amplification signal path, which couples the first output of the first switching circuit 30 to the first input of the second switching circuit 34.

A second input of the first switching circuit 30 is coupled to a first end of the capacitor C12, and a second end of the capacitor C12 is coupled to a second input of the second switching circuit 34. Thus, capacitor C12 defines a unity gain signal path, which couples the second output of the first switching circuit 30 to the second input of the second switching circuit 34.

The switching and amplification control/indication circuit 36 is coupled to the first, second and third switching circuits 30, 34, 35 via an electrical line 40, and outputs at least one switching control signal on the electrical line 40 to the switching circuits. The control signal causes the switching circuits 30, 34 to change state to select either the amplification signal path or the unity gain signal path. The control signal also causes the third switching circuit 35 to select either the output of the second switching circuit 34 or the game port input 17. The first, second and third switching circuits 30, 34, 35 preferably include mechanical, electronic, solid state, gallium arsenide (such as SW-239, which is commercially available from M/A COM, Inc., 1742 Crenshaw Blvd., Torrence, Calif.) or mechanical relays, which switch between the amplification signal path, unity gain signal path, and game port signal path in response to the switching control signal.

In a preferred form of the invention, the switching and amplification control/indication circuit 36 is coupled to the amplifier circuit 32 via an electrical line 42, and outputs a gain control signal to the amplifier circuit 32, which adjusts the gain in the amplification signal path. An output of the second switching circuit 34 is coupled to an input of the third switching circuit 35, and an output of the third switching circuit 35 is coupled to the television signal output circuit 26. The output of the television signal output circuit 26 is coupled to the television receiver 26.

In order to achieve optimal performance when switching between the amplification, unity gain and game port signal paths, isolation between paths should be maximized. The television signal switching circuit 24 formed in accordance with the present invention isolates these paths, and thus substantially improves the reception of the television signal.

The antenna input circuit 28 is preferably used to match impedances between the antennas 16 and the remaining circuitry in the television signal switching circuit 24. The first switching circuit 30 routes the television signal through either the amplification signal path or the unity gain signal path according to a state of the switching control signal.

The switching control circuit 36 provides one or more switching control signals, which toggle both the first and second switching circuits 30, 34 between routing the television signal through the amplification signal path or the unity gain signal path. Preferably, one or more switches activated by the user, such as a pushbutton switch, cause the switching control circuit 36 to change a state of the switching control signal such that the first and second switching circuits 30, 34 route the television signal through either of the two paths.

For instance, while the pushbutton switch is in a first state, the television signal is preferably routed from the antenna input circuit 28 through the first switching circuit 30, the capacitor C8, the amplifier circuit 32, the capacitor C9 and the first input of the second switching circuit 34, that is, the amplification signal path. Similarly, while the pushbutton switch is in a second position, the television signal is preferably routed from the antenna input circuit 28 through the first switching circuit 30, the capacitor C12 and the second input of the second switching circuit 34, that is, the unity gain signal path. Similarly, changing states of the same or a separate pushbutton switch preferably routes either the output of the second switching circuit 34 or the game port input 17 through the third switching circuit 35 to the television receiver 26.

Preferably, the first and second switching circuits 30, 34 receive the same switching control signal while the third switching circuit 35 receives a similar switching control signal synchronized to the switching control signal received by the first and second switching circuits. Thus, preferably all three switching circuits simultaneously route the television signal through the desired path. However, it is to be understood that the switching control signal could as well be multiple signals that selectively route the television signal through the desired path. The gain control signal from the amplification control circuit 36 adjusts the gain of the amplifier circuit 32 in the amplification signal path.

The output of the second switching circuit 34, which represents the television signal after passing through either the amplification or the unity gain signal path, is provided to the third switching circuit 35. The third switching circuit 35 selectively routes the output from the second switching circuit 34 or the game port input 17 to the television signal output circuit 38 in response to the switching control signal. The television signal output circuit 38 conditions the television signal such that it is in a form suitable for reception by the television receiver 26.

It is essential to note that for the television switching circuit formed in accordance with the present invention, the amplification, unity gain and game port signal paths are substantially isolated from each other. Therefore, signal reflections, noise and interference in these paths (normally caused by one path affecting the other in a conventional non-isolated circuit) are minimized.

Figure 3A:
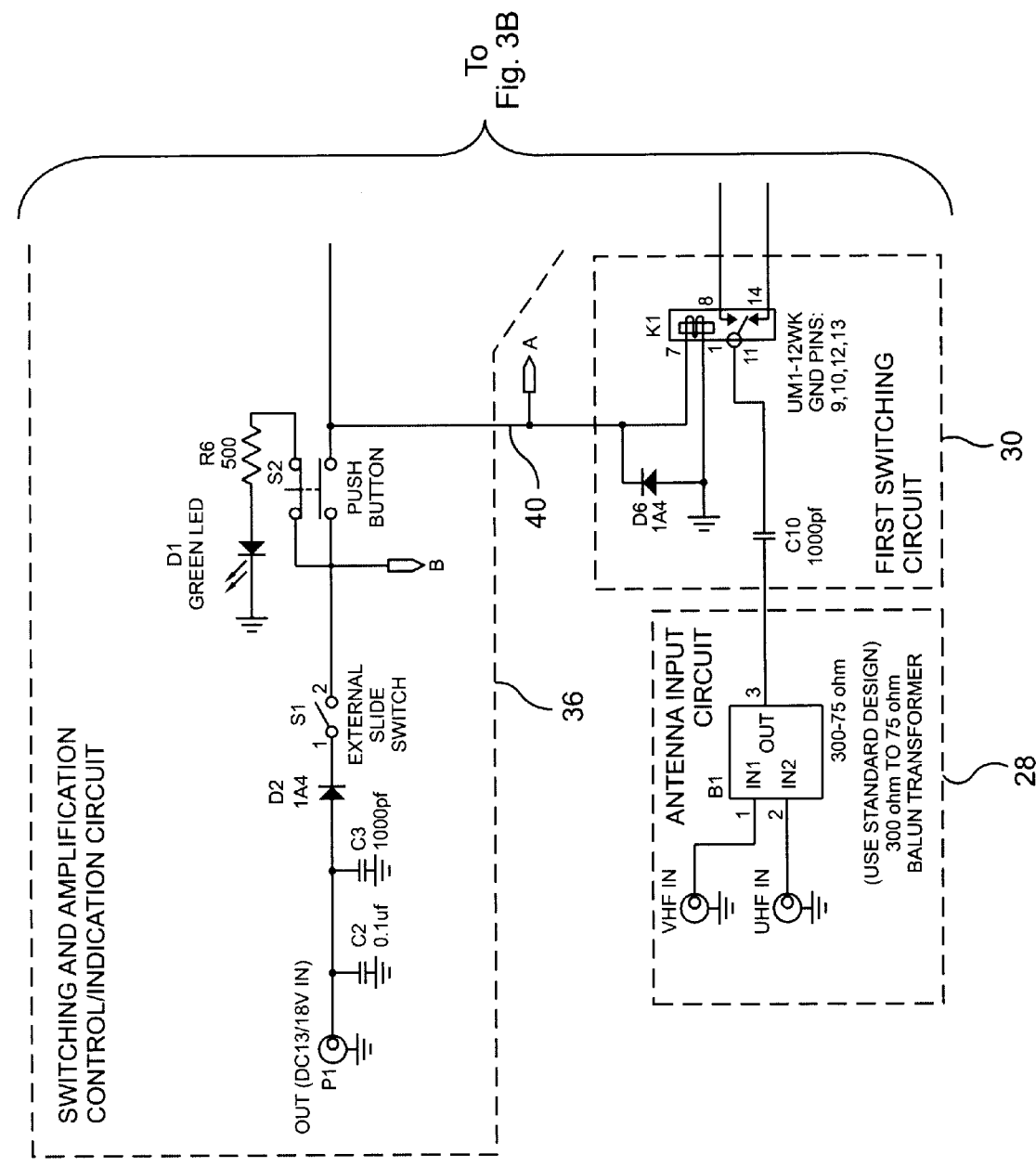
FIGS. 3A–3C are portions of a schematic diagram of the preferred embodiment of the television signal switching circuit shown in FIG. 1.
Figure 3B:
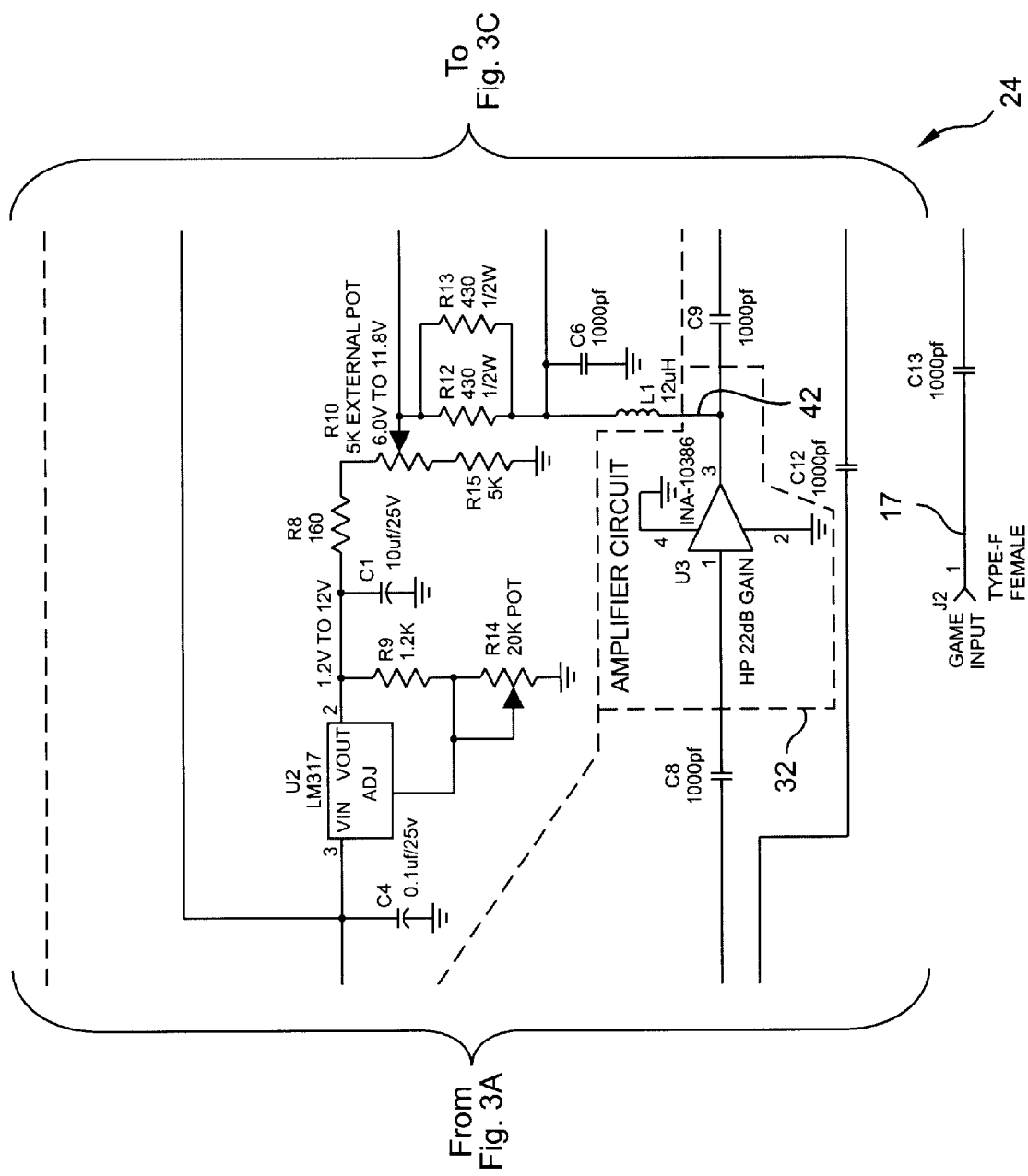
Figure 3C:
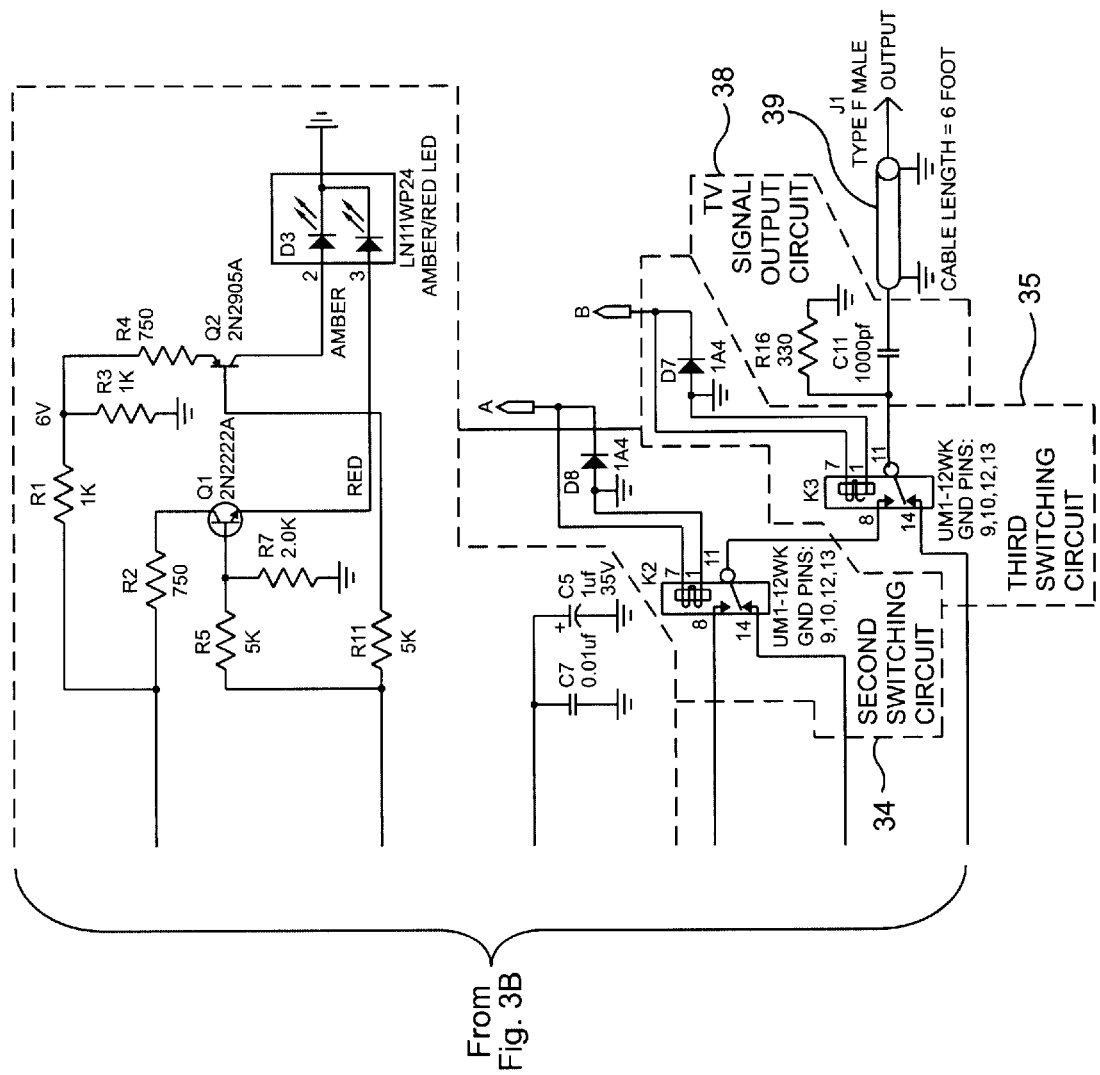

FIG. 3 (i.e., FIGS. 3A–3C) shows a schematic diagram of a preferred embodiment of the television signal switching circuit 24 shown in FIG. 2. This circuit will first be described in relation to the components preferably used therein and the interconnection of these components. The circuit will then be more fully described in relation to its functionality.

The antenna input circuit 28 includes a 300–75 ohm balun transformer B1 having two inputs and an output. The inputs of the balun transformer B1 are coupled to a very high frequency (VHF) input signal terminal and an ultra high frequency (UHF) input signal terminal. The output of the balun transformer B1 is coupled to a first end of a 1000 pF capacitor C10 in the first switching circuit 30.

The first switching circuit also includes a UM1-12WK (or RK1-12V) relay K1 and a diode D6. A second end of the capacitor C10 is coupled to pin 11 of the relay K1. Pin 1 of the relay K1 is coupled to ground and the anode of diode D6. The cathode of diode D6 is coupled to pin 7 of the relay K1. Pin 8 of the relay K1 is coupled to a first end of the capacitor C8, and pin 14 of the relay K1 is coupled to a first end of the capacitor C12.

The amplifier circuit 32 includes a low noise, silicon bipolar amplifier INA-10386 U3 (commercially available from Hewlett Packard Company, San Jose, Calif.). A second end of the capacitor C8 is coupled to an input of the amplifier U3, and an output of the amplifier U3 is coupled to a first end of the capacitor C9. Pins 4 and 2 of the amplifier U3 are coupled to ground.

The second switching circuit 34 includes the UM1-12WK (or RK1-12V) relay K2 and a diode D8. A second end of the capacitor C9 is coupled to pin 8 of the relay K2, and a second end of the capacitor C12 is coupled to pin 14 of the relay K2. Pin 1 of the relay K2 is coupled to ground and the anode of diode D8. Pin 7 of the relay K2 is coupled to the cathode of diode D8 and the switching circuit 36.

The third switching circuit 35 includes the UM1-12WK (or RK1-12V) relay K3 and a diode D7. Pin 11 of the relay K2 is coupled to pin 8 of the relay K3, and a second end of the capacitor C13 is coupled to pin 14 of the relay K3. Pin 1 of the relay K3 is coupled to ground and the anode of diode D7. Pin 7 of the relay K3 is coupled to the second contact of the switch S2.

The television signal output circuit 38 includes a 330ohm resistor R16 and a 1000 pF capacitor C11. Pin 11 of the relay K3 is coupled to a first end of the resistor R16 and a first end of the capacitor C11. A second end of the resistor R16 is coupled to ground, and a second end of the capacitor C11 functions as an output of the television signal switching circuit 24, which is preferably coupled to the television receiver via a cable 39.

The switching and amplification control/indication circuit 36 preferably includes a direct current (DC) reference voltage having a value of about 13–18 volts, which is coupled to a first end of a 0.1 uF capacitor C2, a first end of a 1000 pF capacitor C3 and the anode of a diode D2. The second ends of the capacitors C2 and C3 are coupled to ground. The cathode of diode D2 is coupled to a first contact of an external slide switch S1, and a second contact of the external slide switch S1 is coupled to an upper and a lower input contact of a pushbutton switch S2. An upper output contact of the pushbutton switch S2 is coupled to a first end of a 500 ohm resistor R6. A second end of the resistor R6 is coupled to the anode of a light emitting diode (LED) D1, which is preferably green. The cathode of LED D1 is coupled to ground.

A lower output contact of the pushbutton switch S2 is coupled to the cathodes of diodes D8 and D6 in the first and second switching circuits 30, 34. The lower output contact of the pushbutton switch S2 is also coupled to a positive plate of a 0.1 uF/25V capacitor C4, pin 3 of a DC-DC converter LM317 U2 (commercially available from National Semiconductor, Santa Clara, Calif.), a first end of a 750 ohm resistor R2, and a first end of a 1K ohm resistor R1.

A negative plate of the capacitor C4 is coupled to ground. Pin 1 of the DC-DC converter U2 is coupled to a center tap and a first end of a 20K ohm potentiometer R14 and a second end of a 1.2K ohm resistor R9. A second end of the potentiometer R14 is coupled to ground. Pin 2 of the DC-DC converter U2 is coupled to a first end of the resistor R9, the positive plate of a 10 uF/25V capacitor C1 and a first end of a 160 ohm resistor R8. The negative plate of the capacitor C1 is coupled to ground, and a second end of the resistor R8 is coupled to a first end of a 5K ohm external potentiometer R10.

A second end of the external potentiometer R10 is coupled to a first end of a 5K ohm resistor R15, and a second end of the resistor R15 is coupled to ground. A center tap (the wiper) of the external potentiometer R10 is coupled to first ends of 5K ohm resistors R5, R11, and first ends of 430 ohm resistors R12, R13. Second ends of the resistors R12 and R13 are coupled to a first end of a 12 uH inductor L1, a first end of a 1000 pF capacitor C6, a first end of a capacitor 0.01 uF C7, and a positive plate of a 1 uF/35V capacitor C5. A second end of the capacitor C6, a second end of the capacitor C7 and a negative plate of the capacitor C5 are coupled to ground. A second end of the inductor L1 is coupled to the output of the amplifier U3 and the first end of the capacitor C9.

A second end of the resistor R5 is coupled to a first end of a 1K ohm resistor R7 and the base of a 2N2222A NPN transistor Q1. A second end of the resistor R7 is coupled to ground, and the collector of the transistor Q1 is coupled to a second end of the resistor R2. The emitter of the transistor Q1 is coupled to the anode of a red LN11WP24 LED D3, and a second end of the resistor R11 is coupled to the base of a 2N2905A PNP transistor Q2. The collector of the transistor Q2 is coupled to the anode of an amber LN11WP24 LED D3 and cathodes of the red and amber LED's D3 are coupled to ground. A second end of the resistor R1 is coupled to a first end of a 1K ohm resistor R3 and a first end of a 750 ohm resistor R4. A second end of the resistor R3 is coupled to ground, and a second end of the resistor R4 is coupled to the emitter of the transistor Q2.

The Balun transformer B1 matches the impedance between the television signal from either the VHF or UHF input signals and the remaining circuitry of the television signal switching circuit 24 including the relay K1 and the capacitor C10. If the relay K1 is energized, the television signal is routed to the amplification signal path, which includes the capacitors C8, C9 and the amplifier U3. Conversely, if the relay K1 is de-energized, the television signal is routed through the relay K1 to the unity gain signal path, which includes the capacitor C12.

Similarly, the relay K2 routes the television signal from the amplification signal path to the relay K3 when the relay K2 is energized. Conversely, when the relay K2 is de-energized, the relay K2 routes the television signal from the unity gain signal path to the relay K3. Likewise, the relay K3 routes the television signal from the relay K2 to the television signal output circuit 38 when the relay K3 is energized, and routes the game port signal from the game port input 17 to the output circuit 38 when the relay K3 is de-energized. The diodes D6, D7, and D8 function to dissipate the reverse electric field resulting from the de-energization of the relays, which causes sparking and contact pitting.

In the television signal output circuit 38, the resistor R16 biases the television signal to ground, and the capacitor C11 functions to block DC components introduced into the television signal prior to its being received by the television. Capacitors C8, C9, C12, and C13 also block direct current (DC) components introduced into the television signal.

The external slide switch S1 is either open or closed, and is used to select the game port input 17, the amplification signal path or the unity gain signal path from the output of relays K1 and K2 simultaneously. When the switch S1 is open, the LED's are off and each of the relays are de-energized, which causes the relay K3 to route the signal from the game port input 17 to the television receiver. Conversely, when the switch S1 is closed, the relay K3 routes the signal from either the amplification signal path or the unity gain signal path to the television receiver.

The pushbutton switch S2 includes an upper set of contacts and a lower set of contacts. The pushbutton switch S2 enables the user to select whether the television signal is routed through either the amplification signal path or the unity gain signal path. The unity gain signal path is chosen when the pushbutton switch S2 connects its upper contacts, which also illuminates the green LED DI and de-energizes the relays K1, K2.

In contrast, the amplification signal path is chosen when the pushbutton switch S2 connects its lower contacts, which energizes the relays K1, K2 and provides an input voltage to the DC-DC converter U2 from the voltage reference. The input voltage of the DC-DC converter U2 is preferably between 13–18 volts, and the output voltage of the DC-DC converter U2 is preferably adjustable from 1.2 volts to 12 volts by the potentiometer R14.

The external potentiometer R10 can be adjusted by the user to vary the output gain of the amplifier U3. The resistors R12, R13 and the capacitors C5, C6, C7 provide filtering for a direct current (DC) bias to power the amplifier U3 via the inductor L1. The inductor L1 is preferably used in place of a resistor to avoid RF leakage onto the DC line.

If the television signal is routed through the amplification signal path and the voltage at the output of the DC-DC converter U2 is about 6–11.8 volts, the transistor Q1 is biased by the resistors R2, R5, R7 such that it is on and conducts electrical current through the red LED D3. Electrical current flowing through the red LED D3 causes it to be illuminated. The illumination of the red LED D3 indicates an upper range for the gain of the amplifier U3. Similarly, if the television signal is routed through the amplification signal path and the voltage at the output of the DC-DC converter U2 is about 0–6 volts, resistors R1, R3, R4, R11 bias the transistor Q2 such that it is on and conducts electrical current through the amber LED D3. Electrical current flowing through the amber LED D3 causes it to be illuminated. The illumination of the amber LED D3 indicates a lower range for the gain of the amplifier U3.

In summary, when the amplification signal path is chosen, the green LED D1 is off and either the red or the amber LED D3 is on indicating an upper or lower gain range. Conversely, if the unity gain signal path is chosen, the green LED D1 is on and both the amber and red LED's D3 are off. Table 1 further summarizes the states of the LED's, relays and the path chosen in response to the state of the witches S1, S2. "D" indicates that the corresponding relay is de-energized, and "E" indicates that the corresponding relay is energized.

TABLE 1

| S1 Switch | S2 Switch | Green LED | Red LED | Amber LED | K1 Relay | K2 Relay | K3 Relay | Path |
|---|---|---|---|---|---|---|---|---|
| Open | Up | Off | Off | Off | D | D | D | game port |
| Open | Down | Off | Off | Off | D | D | D | game port |
| Closed | Up | On | Off | Off | D | D | E | unity gain |
| Closed | Down | Off | Off/On | Off/On | E | E | E | amp |

Figure 1:
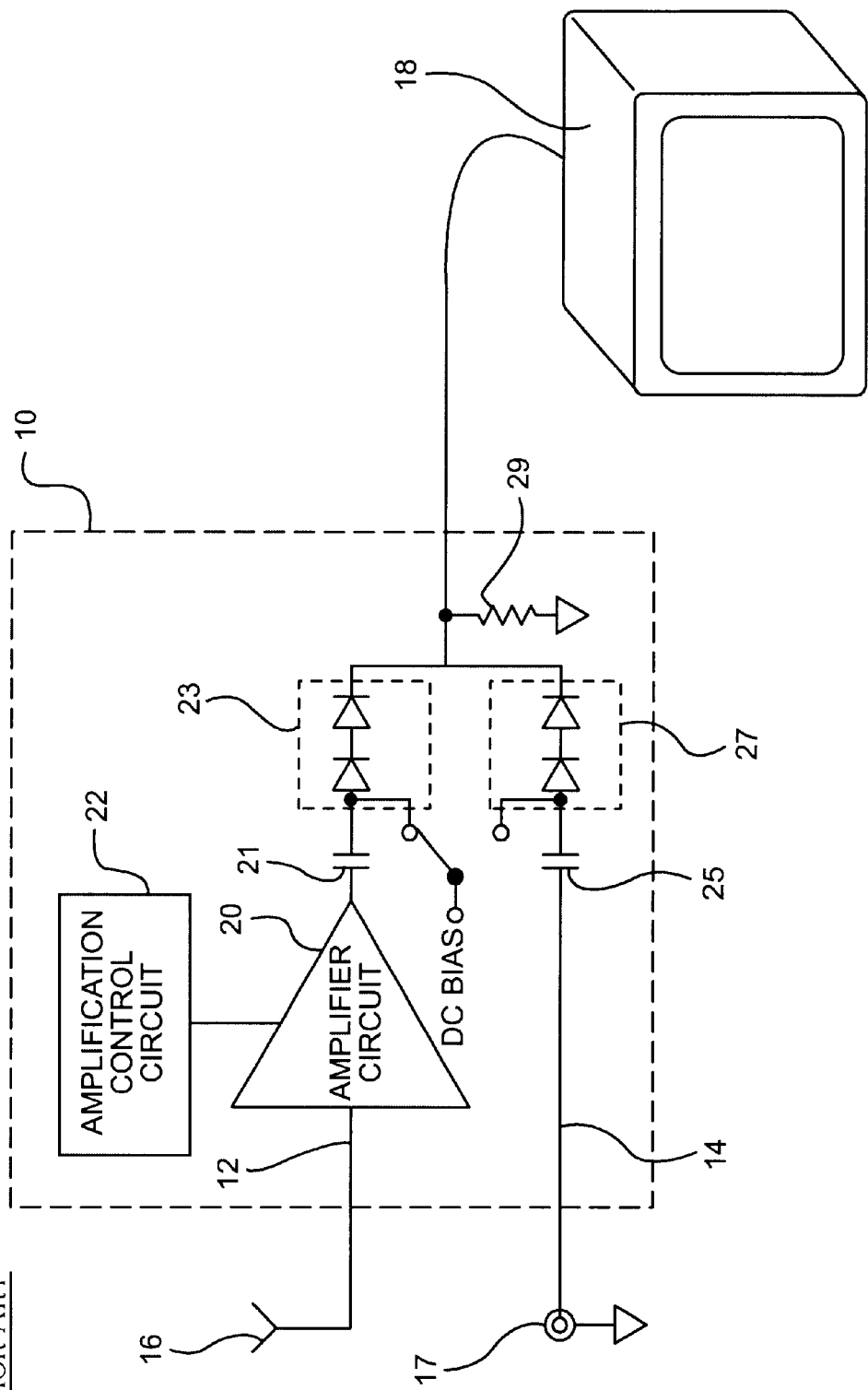
FIG. 1 is a block diagram of a television signal switching circuit of the prior art.
Figure 4B:
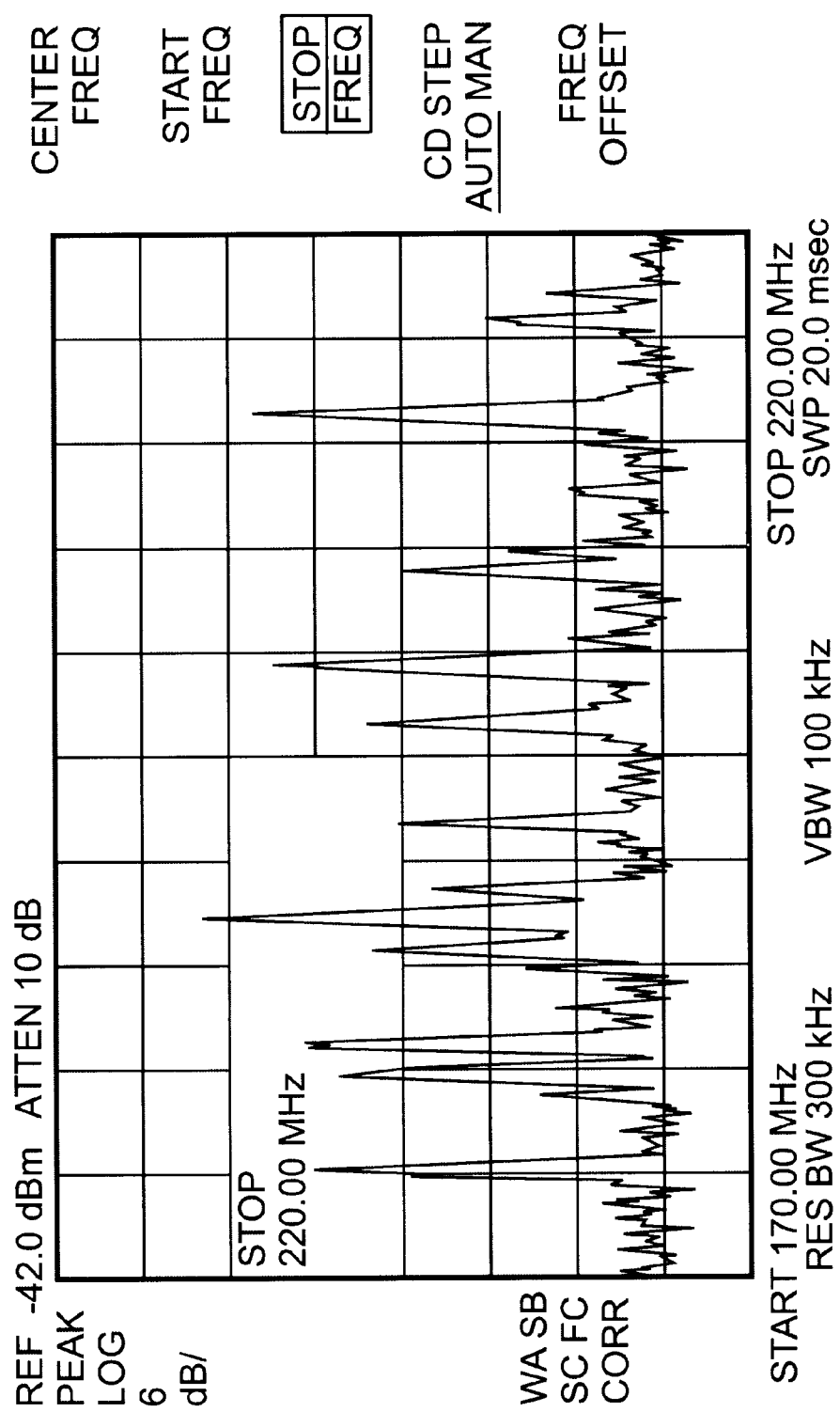

FIG. 4A is a graph of signal strength in dBm versus frequency showing a spectral content of the television signal over a frequency range of about 45–95 MHz following the amplification/unity gain signal path in the conventional television signal switching circuit shown in FIG. 1 when the amplifier circuit is powered. Similarly, FIG. 4B is a graph of signal strength in dBm versus frequency showing the spectral content of the television signal over a frequency range of about 170–220 MHz under similar conditions.

Figure 5A:
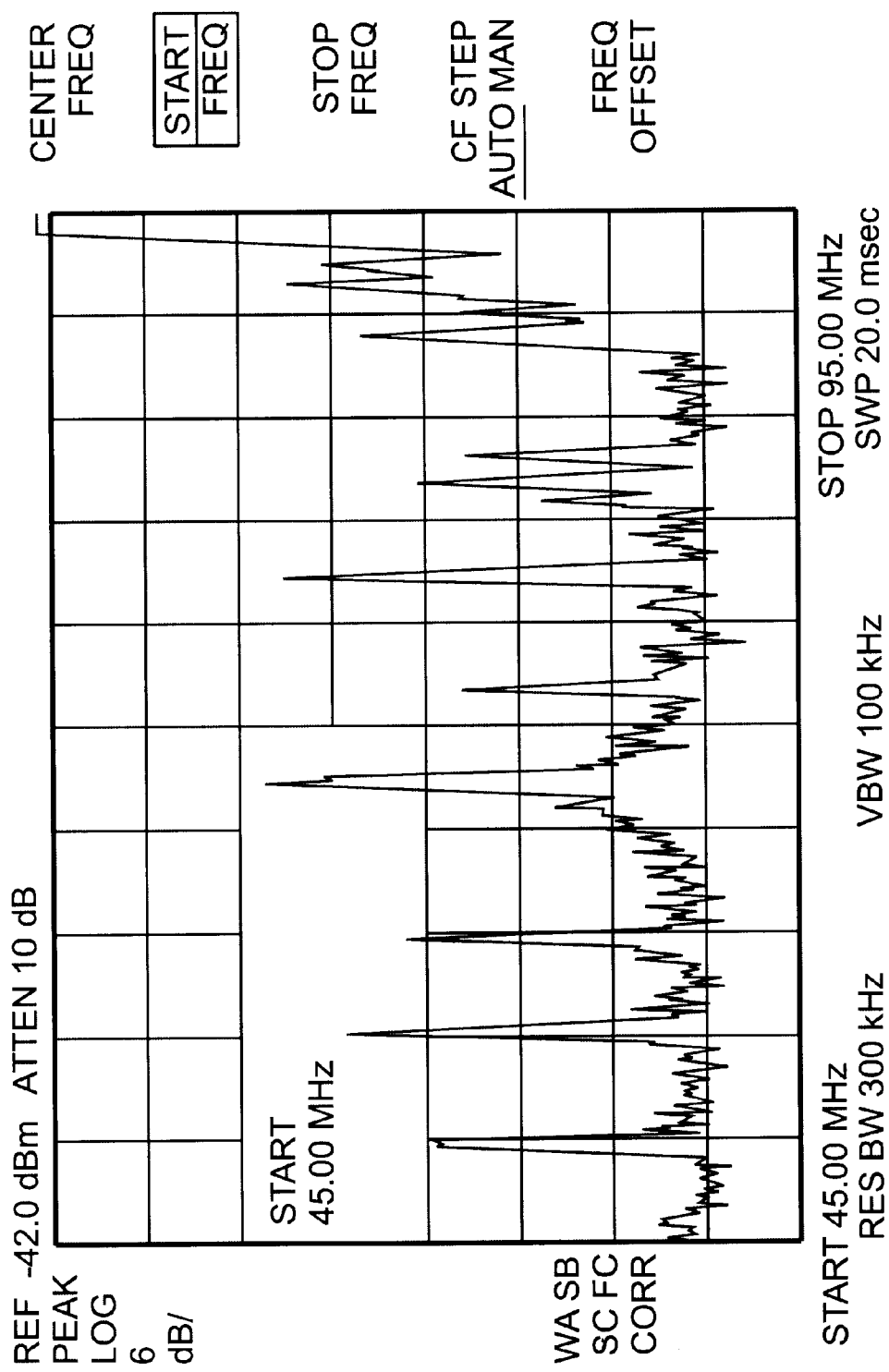
FIGS. 5A and 5B are graphs of signal strength in dBm versus frequency, which show a frequency spectrum of a broadcast television signal in the Very High Frequency (VHF) range following an amplification signal path in the television signal switching circuit formed in accordance with the present invention and shown in FIG. 3 over a low VHF frequency range and a high VHF frequency range, respectively.
Figure 5B:
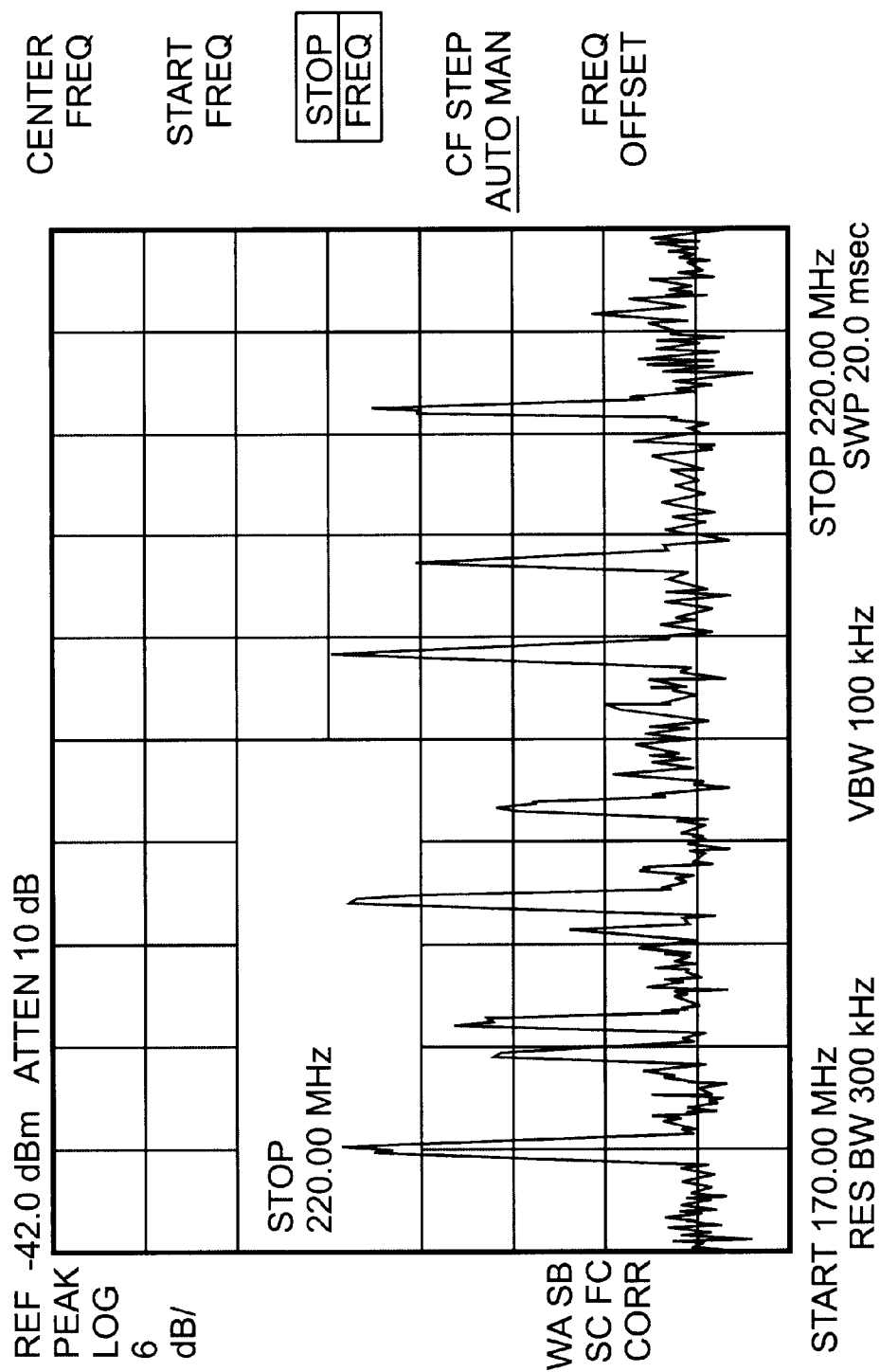

FIGS. 5A and 5B are graphs of signal strength in dBm versus frequency showing the spectral content of the television signal following the amplification signal path in the preferred embodiment of the television signal switching circuit shown in FIGS. 2 and 3 over the same frequency ranges shown in FIGS. 4A and 4B, respectively.

Figure 6:
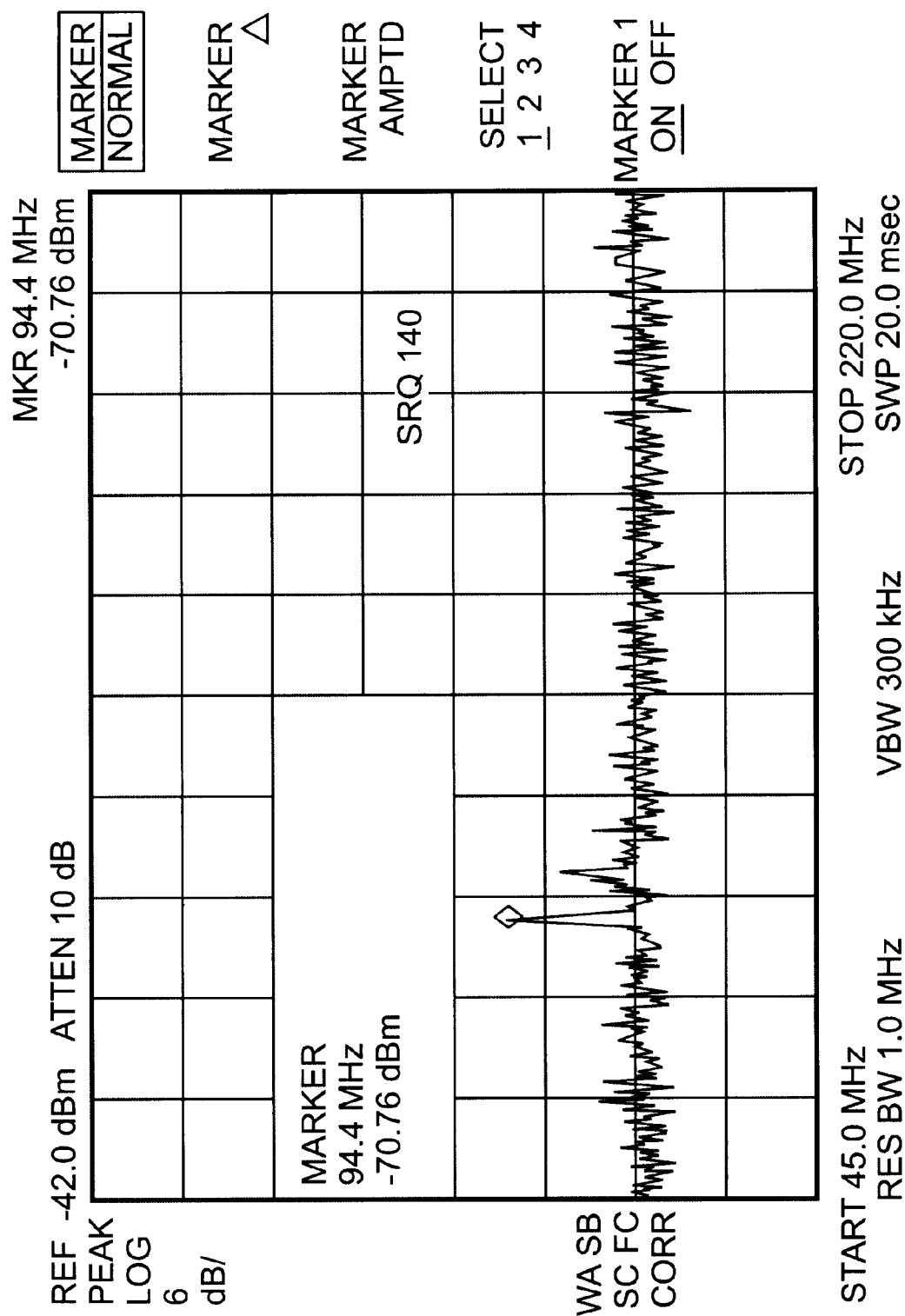
FIG. 6 is a graph of signal strength in dBm versus frequency, which shows a frequency spectrum of a broadcast television signal in the Very High Frequency (VHF) range following an amplification/unity gain signal path in the conventional television signal switching circuit shown in FIG. 1 having no gain.
Figure 7A:
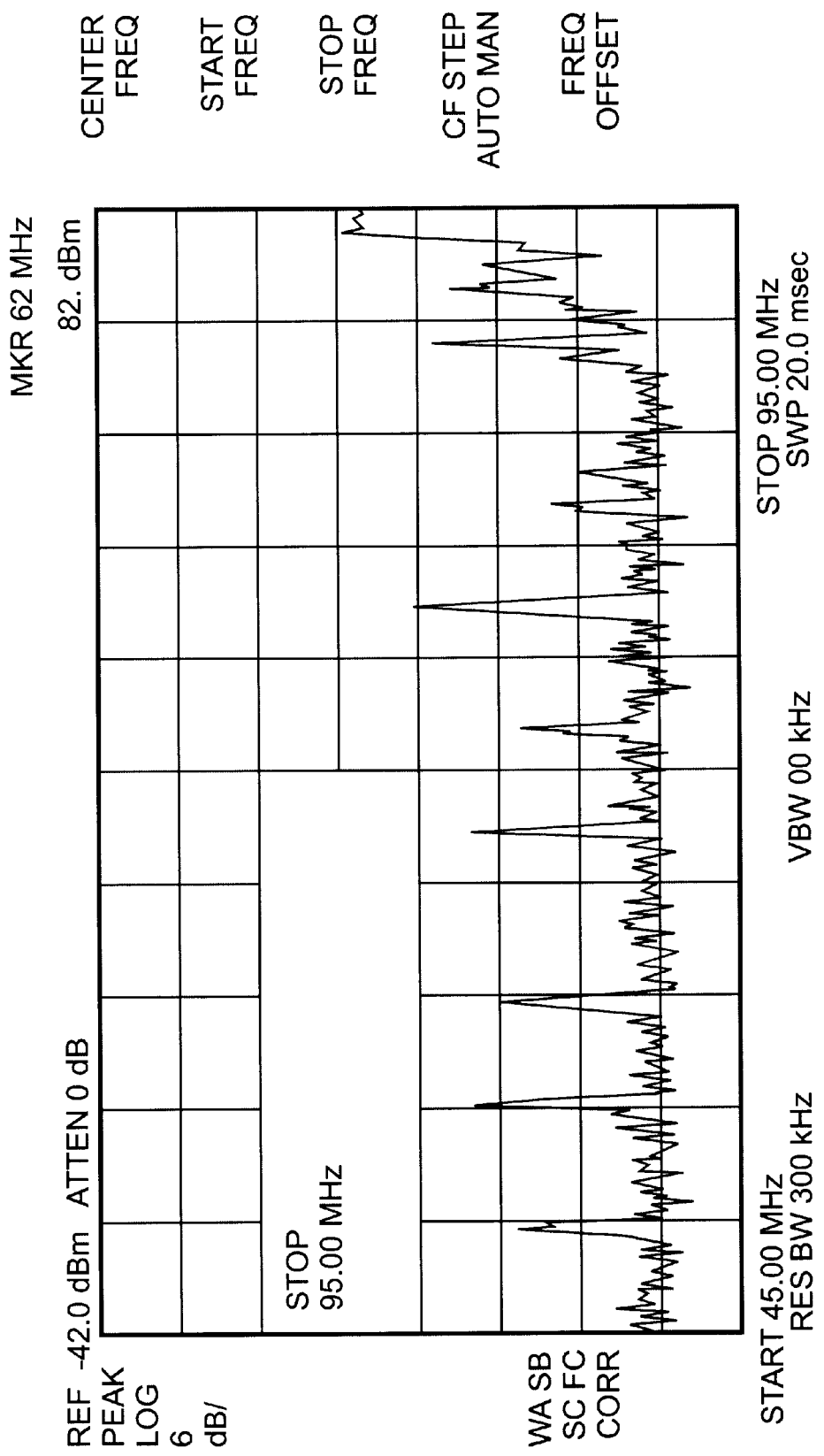
FIGS. 7A and 7B are graphs of signal strength in dBm versus frequency, which show a frequency spectrum of a broadcast television signal in the Very High Frequency (VHF) range following an amplification signal path having no gain in the television signal switching circuit formed in accordance with the present invention and shown in FIG. 3 over a low VHF frequency range and a high VHF frequency range, respectively.
Figure 7B:
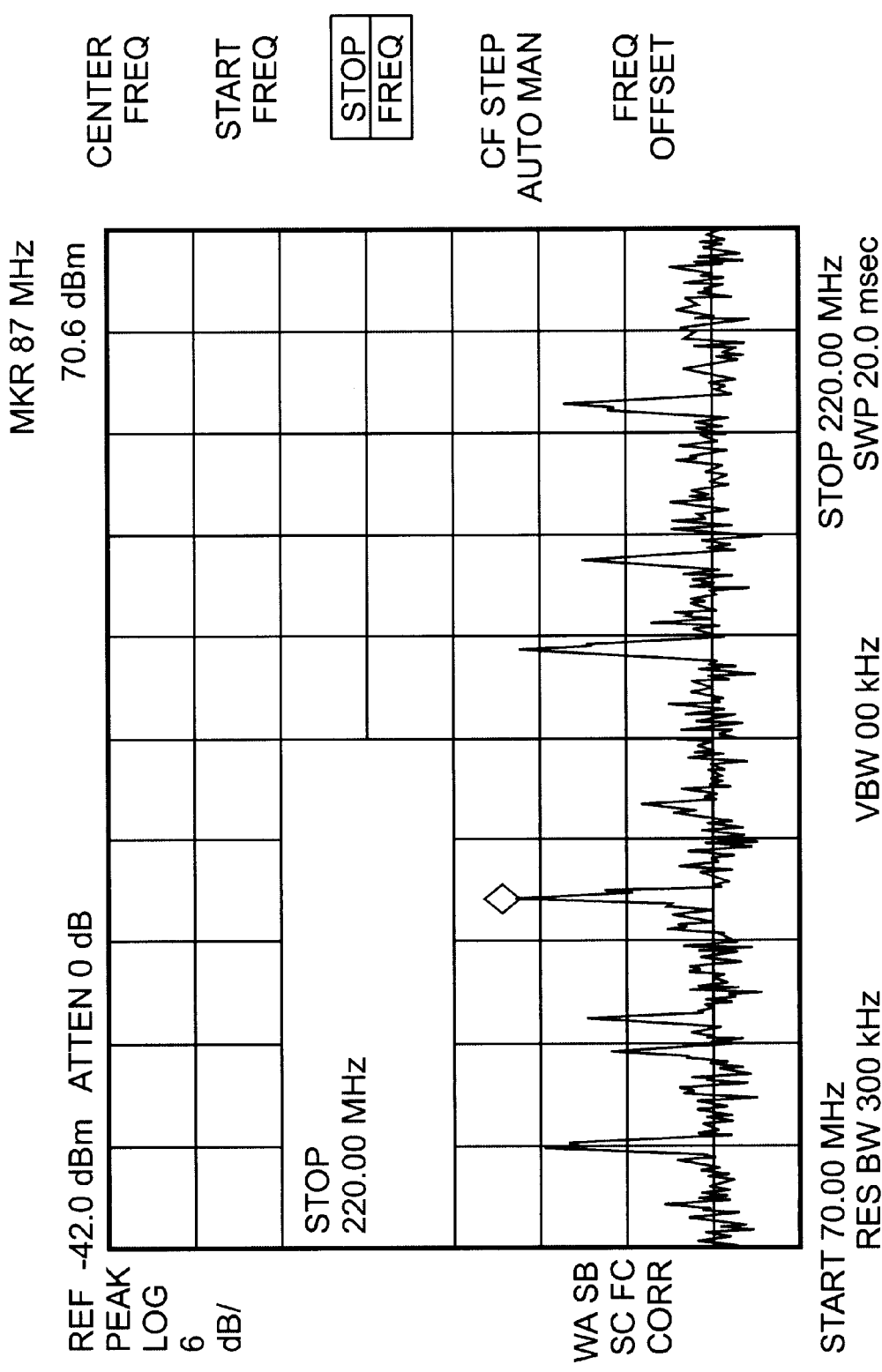

FIG. 6 is a graph of signal strength in dBm versus frequency which shows the frequency spectrum of a television signal in the VHF range after the amplification/unity gain path in the conventional television signal switching circuit shown in FIG. 1 when the amplifier is not supplied with power. FIGS. 7A and 7B are graphs of signal strength in dBm versus frequency which show the frequency spectrum of the television signal in the low and high VHF ranges, respectively, following the amplification signal path in the television signal switching circuit formed in accordance with the present invention and shown in FIG. 3. The height of the boxes in FIGS. 4A, 4B, 5A, 5B, 6, 7A, and 7B represents 6 dBm.

A comparison of FIGS. 4A and 5A, FIGS. 4B and 5B, and FIGS. 6, 7A and 7B shows that the noise floor of the television signal is substantially reduced by about 6–12 dBm when using the circuit formed in accordance with the present invention. Since signal-to-noise ratio (SNR), as a measure of signal quality, is the ratio of the magnitude of the signal to that of the noise, the SNR increases as the noise floor decreases. Thus, the television signal switching circuit of the present invention significantly improves the SNR of the television signal, which results in a higher quality signal and improved reception at the television receiver.

Figure 8:
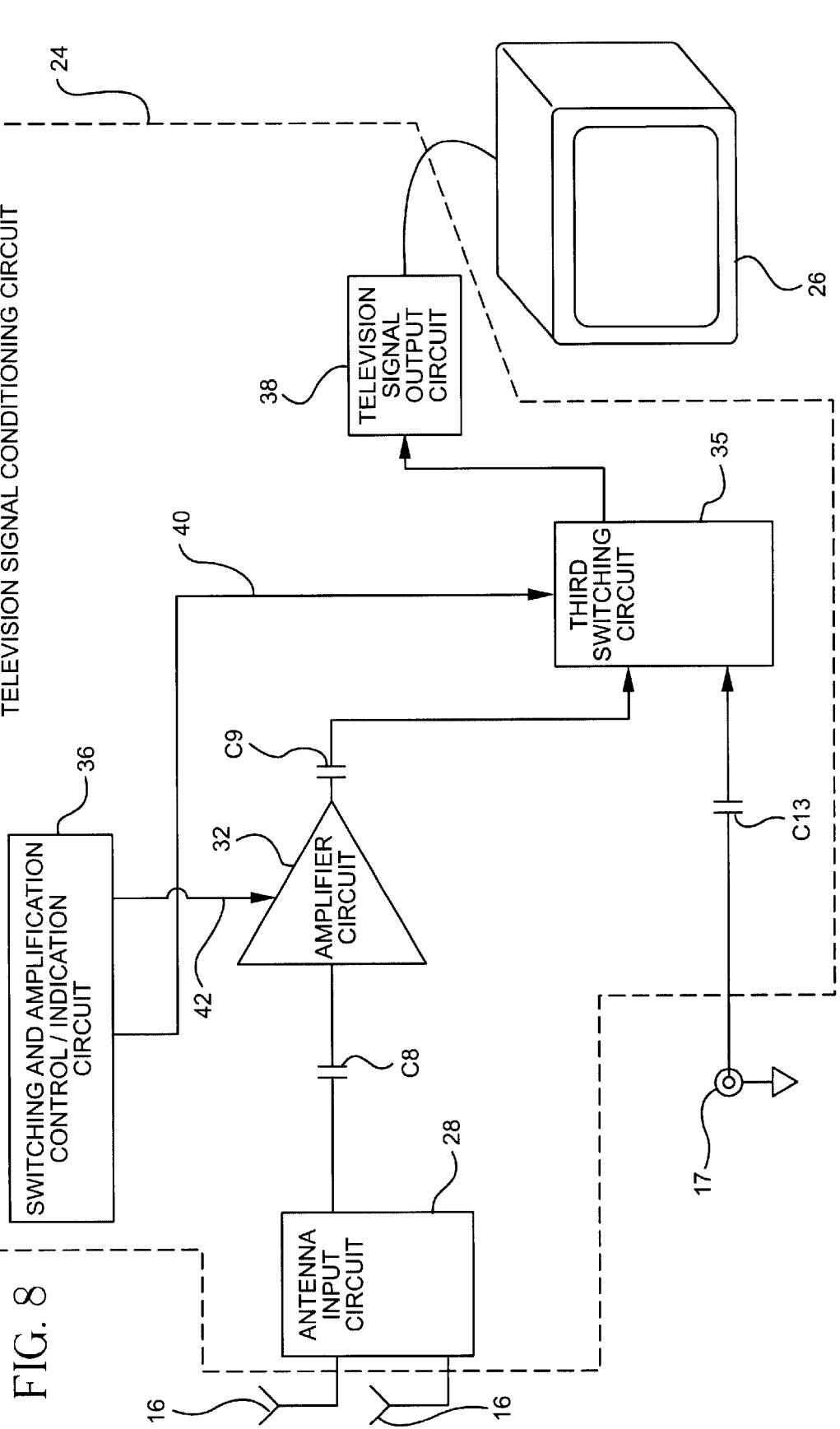
FIGS. 8–11 are block diagrams of alternative embodiments of the television signal switching circuit formed in accordance with the present invention.

FIG. 8 is a block diagram of a second embodiment of the present invention, which differs from the first embodiment in that the capacitors C8, C9 and the amplifier circuit 32 are coupled in series between the output of the antenna input circuit 28 and the first input of the third switching circuit 35. In addition, the first and second switching circuits have been omitted. In the second embodiment, the amplifier circuit 32 provides the gain chosen to the television signal when the amplifier circuit 32 is selectively powered, and provides unity gain when the amplifier circuit 32 is not powered. The third switching circuit 35 selects between the output of the amplifier circuit 32 with or without gain, and the game port input 17 for routing to the television signal output circuit 38.

Figure 9:
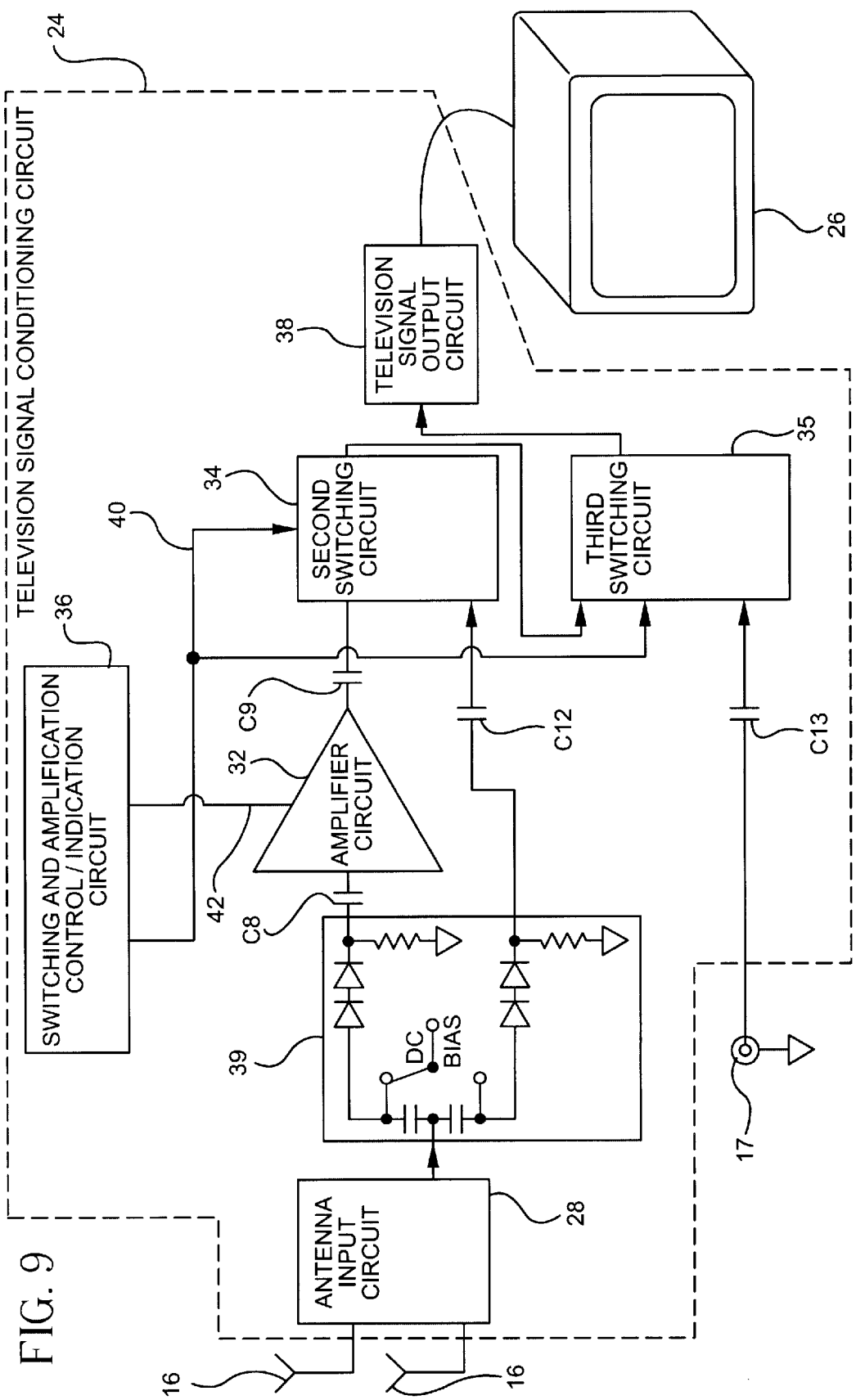

FIG. 9 is a block diagram of a third embodiment of the present invention, which differs from the first embodiment in that an isolation circuit 39, such as that shown implemented with diodes, is substituted for the first switching circuit. The DC bias is selectively applied to the anode of the first diode in one of the diode pairs in the isolation circuit 39, and that pair is biased such that the corresponding signal is allowed to pass through either the amplification signal path or the unity gain signal path. The capacitors in the isolation circuit 39 essentially block any component of the DC bias to the antenna input circuit 28, while enabling only one of the diode pairs to be biased on. The resistors in the isolation circuit function to allow residual charge introduced by the DC bias to escape to ground.

Figure 10A:
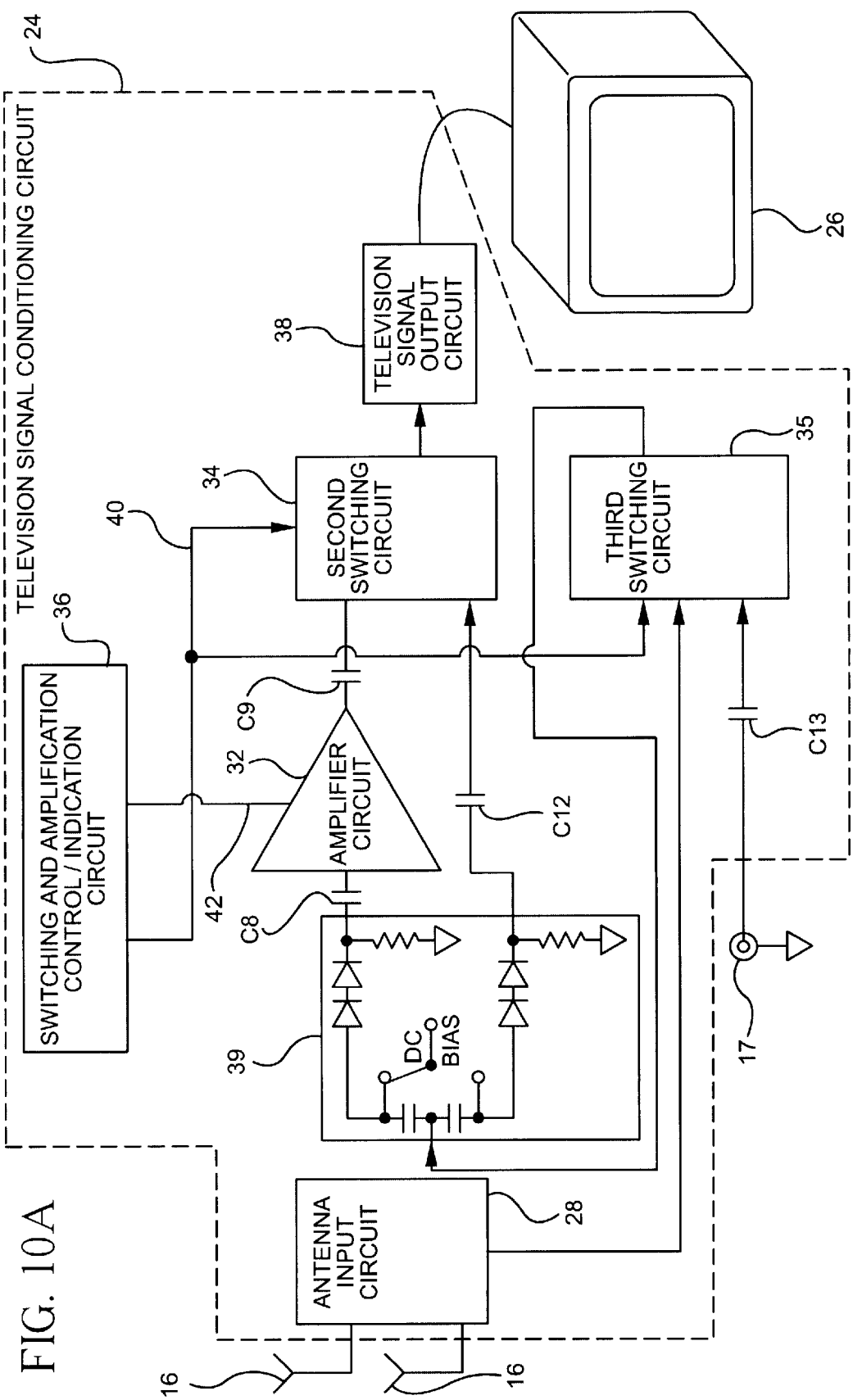
Figure 10B:
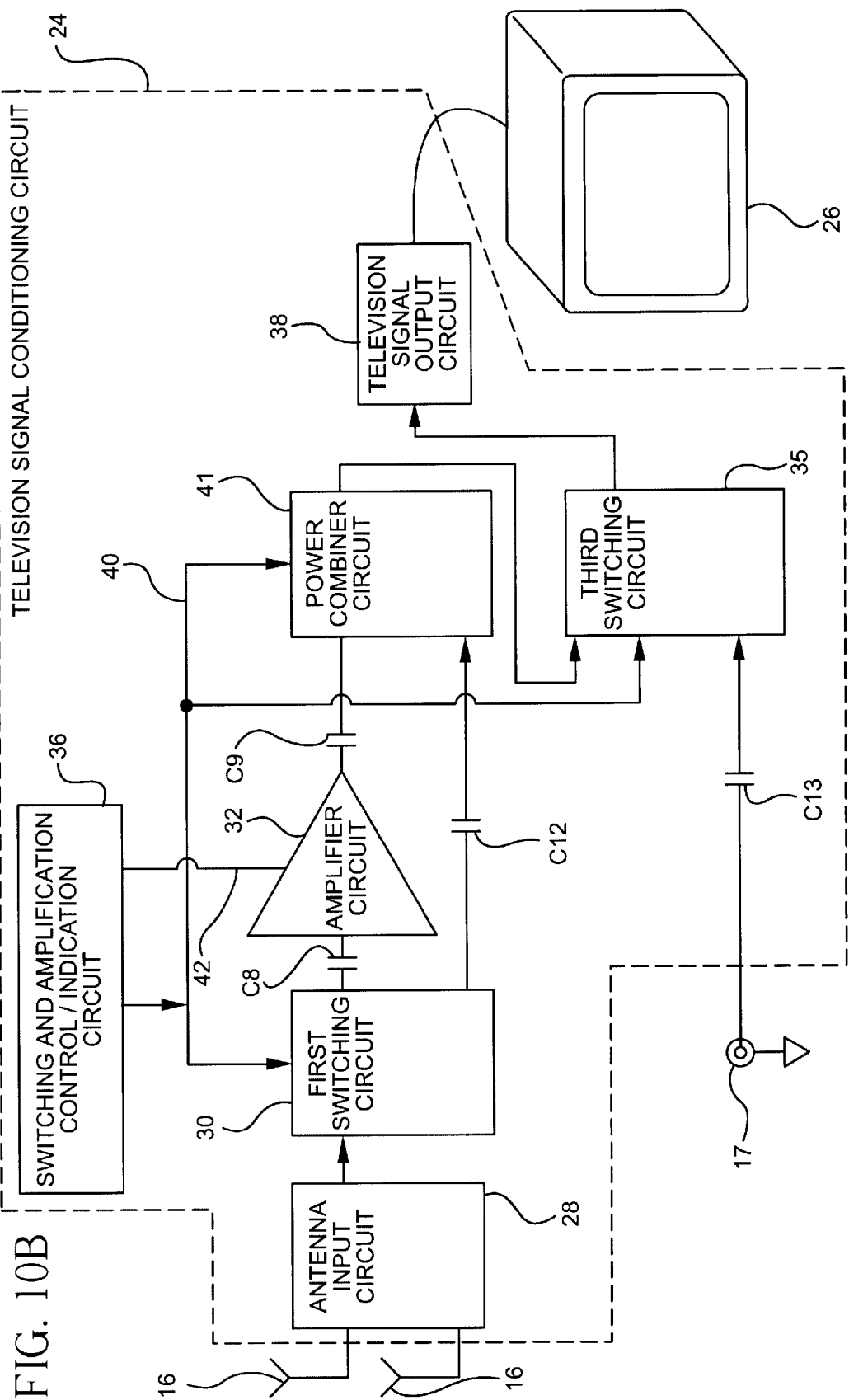

FIG. 10a is a block diagram of a fourth embodiment of the present invention, which is substantially the same as the third embodiment except that the third switching circuit 35 has been relocated to be between the antenna input circuit 28 and the isolation circuit 39. In the fourth embodiment, the output of the second switching circuit 34 is coupled to the television signal output circuit 38, and the game port signal input 17 can be applied to the unity gain signal path. FIG. 10b is a block diagram of a fifth embodiment, which is substantially similar to the third embodiment shown in FIG. 9, except that the isolation circuit 39 has been replaced with a first switching circuit 30 and the second switching circuit 34 has been replaced with a power combiner circuit 41.

Figure 11:
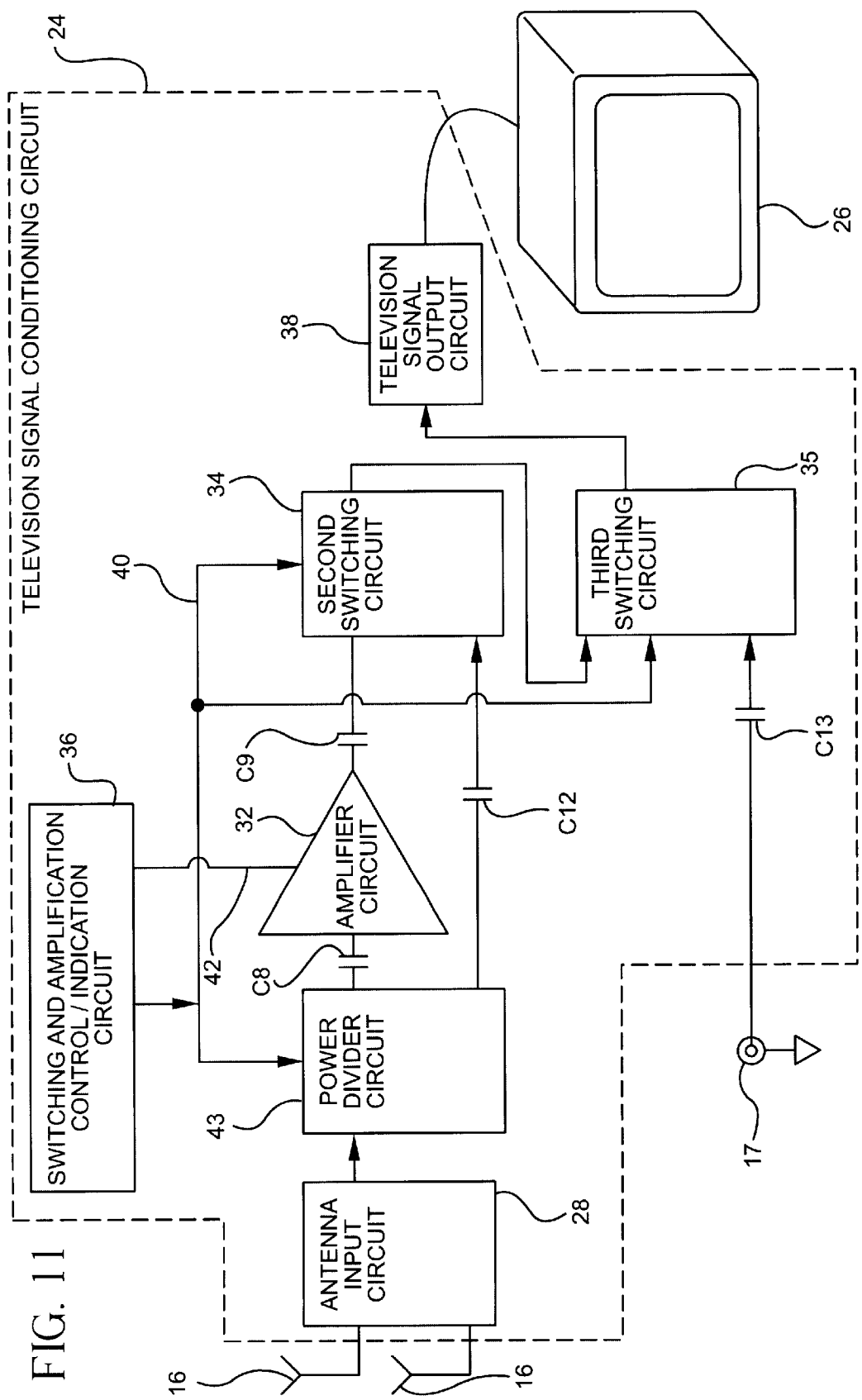

FIG. 11 is a block diagram of a sixth embodiment of the present invention, which is substantially similar to the first embodiment except that a power divider circuit 43 has been substituted for the first switching circuit. In the sixth embodiment, the power divider circuit 43 is preferably a 3dB 2-way splitter, which splits the output of the antenna input circuit 28 into two equal paths having a loss of 3dB in each path. In addition, in the sixth embodiment, the second switching circuit 34 is preferably a relay, which selects between one of the two input paths and terminates the unselected path in an appropriate impedance, such as 75 ohms.

From the foregoing description, it will be appreciated by those skilled in the art that a television signal switching circuit formed in accordance with the present invention provides an apparatus which reduces signal reflection, crosstalk, and noise in and between alternate gain paths of a broadcast, cable or game port television signal. It is also to be appreciated that such an apparatus significantly improves the isolation between alternate gain paths and the SNR of the television signal. Thus, the television signal switching circuit of the present invention greatly improves the quality of a television signal, which enables better reception of the signal by a television receiver.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A television signal switching circuit, the television signal switching circuit comprising:
    a switching control circuit, the switching control circuit outputting a first switching control signal, the switching control signal having a first state and a second state;
    a first switching circuit, the first switching circuit including an input, a first output and a second output, the input of the first switching circuit being responsive to a television signal, the first output of the first switching circuit being coupled to an amplification signal path, the second output of the first switching circuit being coupled to a unity gain signal path, the first switching circuit being responsive to the first switching control signal, the first switching circuit coupling the input of the first switching circuit to the first output of the first switching circuit in response to the first switching control signal being in the first state, the first switching circuit coupling the input of the first switching circuit to the second output of the first switching circuit in response to the first switching control signal being in the second state; and
    a second switching circuit, the second switching circuit including a first input, a second input and an output, the first input of the second switching circuit being coupled to the amplification signal path, the second input of the second switching circuit being coupled to the unity gain signal path, the second switching circuit being responsive to the first switching control signal, the second switching circuit coupling the first input of the second switching circuit to the output of the second switching circuit in response to the first switching control signal being in the first state, the second switching circuit coupling the second input of the second switching circuit to the output of the second switching circuit in response to the first switching control signal being in the second state.

2. A television signal switching circuit as defined by claim 1, wherein at least one of the first switching circuit and the second switching circuit includes an electromechanical relay.

3. A television signal switching circuit as defined by claim 1, wherein at least one of the first switching circuit and the second switching circuit includes an electronic relay.

4. A television signal switching circuit as defined by claim 1, wherein at least one of the first switching circuit and the second switching circuit includes a mechanical relay.

5. A television signal switching circuit as defined by claim 1, wherein the switching control circuit outputs a second switching control signal, the second switching control signal having a first state and a second state, the television signal switching circuit further including a third switching circuit, the third switching circuit including a first input, a second input and an output, the first input of the third switching circuit being responsive to the output of the second switching circuit, the second input of the third switching circuit being responsive to a game port signal, the third switching circuit being responsive to the second switching control signal, the amplification path, unity gain path and game port signal being substantially isolated from each other, the third switching circuit coupling the first input of the third switching circuit to the output of the third switching circuit in response to the second switching control signal being in the first state, the third switching circuit coupling the second input of the third switching circuit to the output of the third switching circuit in response to the second switching control signal being in the second state, the amplification signal path, the unity gain signal path and the game port signal path being substantially isolated from each other.

6. A television signal switching circuit as defined by claim 5, wherein the third switching circuit includes at least one of an electromechanical, an electrical and a mechanical relay.

7. A television signal switching circuit, the television signal switching circuit comprising:
    a switching control circuit, the switching control circuit outputting a first switching control signal, the first switching control signal having a first state and a second state, the switching control circuit outputting a second switching control signal, the second switching control signal having a first state and a second state;
    a first switching circuit, the first switching circuit including an input, a first output and a second output, the input of the first switching circuit being responsive to a television signal, the first output of the first switching circuit being coupled to an amplification signal path, the second output of the first switching circuit being coupled to a unity gain signal path, the first switching circuit being responsive to the first switching control signal, the first switching circuit coupling the input of the first switching circuit to the first output of the first switching circuit in response to the first switching control signal being in the first state, the first switching circuit coupling the input of the first switching circuit to the second output of the first switching circuit in response to the first switching control signal being in the second state; and
    a second switching circuit, the second switching circuit including a first input, a second input and an output, the first input of the second switching circuit being coupled to the amplification signal path, the second input of the second switching circuit being coupled to the unity gain signal path, the second switching circuit being responsive to the first switching control signal, the second switching circuit coupling the first input of the second switching circuit to the output of the second switching circuit in response to the first switching control signal being in the first state, the second switching circuit coupling the second input of the second switching circuit to the output of the second switching circuit in response to the first switching control signal being in the second state; and
    a third switching circuit, a third switching circuit including a first input, a second input and an output, the first input of the third switching circuit being responsive to the output of the second switching circuit, the second input of the third switching circuit being responsive to a game port signal, the third switching circuit being responsive to the second switching control signal, the third switching circuit coupling the first input of the third switching circuit to the output of the third switching circuit in response to the second switching control signal being in the first state, the third switching circuit coupling the second input of the third switching circuit to the output of the third switching circuit in response to the second switching control signal being in the second state, the amplification signal path, unity gain signal path and the game port signal being substantially isolated from each other.

8. A television signal switching circuit as defined by claim 7, wherein at least one of the first switching circuit, the second switching circuit and the third switching circuit includes an electromechanical relay.

9. A television signal switching circuit as defined by claim 7, wherein at least one of the first switching circuit, the second switching circuit and the third switching circuit includes an electronic relay.

10. A television signal switching circuit as defined by claim 7, wherein at least one of the first switching circuit, the second switching circuit and the third switching circuit includes a mechanical relay.

11. A television signal switching circuit as defined by claim 7, wherein at least one of the first switching circuit and the second switching circuit includes an isolation circuit.

12. A television signal switching circuit as defined by claim 11, wherein the isolation circuit includes at least one diode.

13. A television signal switching circuit as defined by claim 7, wherein the first switching circuit includes a power divider circuit.

14. A television signal switching circuit as defined by claim 7, wherein the second switching circuit includes a power combiner circuit.

15. A television signal switching circuit as defined by claim 14, wherein the power combiner circuit includes at least one stub, the stub being coupled to at least one of the first input, the second input and the output of the second switching circuit, the power combiner coupling the first and second inputs to the output of the second switching circuit.

16. A television signal switching circuit, the television signal switching circuit comprising:

a switching control circuit, the switching control circuit outputting a first switching control signal, the first switching control signal having a first state and a second state, the switching control circuit outputting a second switching control signal, the second switching control signal having a first state and a second state;

a third switching circuit, a third switching circuit including a first input, a second input and an output, the first input of the third switching circuit being responsive to a television signal, the second input of the third switching circuit being responsive to a game port signal, the third switching circuit being responsive to the second switching control signal, the third switching circuit coupling the first input of the third switching circuit to the output of the third switching circuit in response to the second switching control signal being in the first state, the third switching circuit coupling the second input of the third switching circuit to the output of the third switching circuit in response to the second switching control signal being in the second state;

a first switching circuit, the first switching circuit including an input, a first output and a second output, the input of the first switching circuit being responsive to the output of the third switching circuit, the first output of the first switching circuit being coupled to an amplification signal path, the second output of the first switching circuit being coupled to a unity gain signal path, the first switching circuit being responsive to the first switching control signal, the first switching circuit coupling the input of the first switching circuit to the first output of the first switching circuit in response to the first switching control signal being in the first state, the first switching circuit coupling the input of the first switching circuit the second output of the first switching circuit in response to the first switching control signal being in the second state; and a second switching circuit, the second switching circuit including a first input, a second input and an output, the first input of the second switching circuit being coupled to the amplification signal path, the second input of the second switching circuit being coupled to the unity gain signal path, the second switching circuit being responsive to the first switching control signal, the second switching circuit coupling the first input of the second switching circuit to the output of the second switching circuit in response to the first switching control signal being in the first state, the second switching circuit coupling the second input of the second switching circuit to the output of the second switching circuit in response to the first switching control signal being in the second state, the amplification signal path, unity gain signal path and game port signal being substantially isolated from each other.

17. A television signal switching circuit as defined by claim 16, wherein at least one of the first switching circuit, the second switching circuit and the third switching circuit includes an electromechanical relay.

18. A television signal switching circuit as defined by claim 16, wherein at least one of the first switching circuit, the second switching circuit and the third switching circuit includes an electronic relay.

19. A television signal switching circuit as defined by claim 16, wherein at least one of the first switching circuit, the second switching circuit and the third switching circuit includes a mechanical relay.

20. A television signal switching circuit as defined by claim 16, wherein at least one of the first switching circuit and the second switching circuit includes an isolation circuit.

21. A television signal switching circuit as defined by claim 20, wherein the isolation circuit includes at least one diode.

22. A television signal switching circuit as defined by claim 16, wherein the first switching circuit includes a power divider circuit.

23. A television signal switching circuit as defined by claim 16, wherein the second switching circuit includes a power combiner circuit.

24. A television signal switching circuit as defined by claim 23, wherein the power combiner circuit includes at least one stub, the stub being coupled to at least one of the first input, the second input and the output of the second switching circuit, the power combiner coupling the first and second inputs to the output of the second switching circuit.

* * * * *